MORNING CALL SYSTEM

Filed July 7, 1959 2 Sheets-Sheet 1

INVENTORS C. BREEN
H. J. MICHAEL
BY J. R. McCorkendale
ATTORNEY

MORNING CALL SYSTEM

Filed July 7, 1959

INVENTORS C. BREEN
H. J. MICHAEL
BY J. R. McCorkendale
ATTORNEY

United States Patent Office 3,046,339
Patented July 24, 1962

3,046,339
MORNING CALL SYSTEM

Charles Breen, Mineola, and Henry J. Michael, Rockville Center, N.Y., assignors to Bell Telephone Laboratories, Incorporated, New York, N.Y., a corporation of New York Filed July 7, 1959, Ser. No. 825,604
18 Claims. (Cl. 179—2)

This invention relates to signaling systems and particularly to special service signaling systems of the type wherein telephone facilities are utilized to alert subscribers on a selective basis at predetermined times. Such systems are commonly referred to as "Morning Call Systems."

In certain types of multitenant dwellings such as, for example, hotels and motels, it is desirable that a "call" or "wake-up" service be provided by the management upon which the guests may rely to be alerted, or called, at predesignated times. Such a service has been commonly provided in the past with use of the existing telephone facilities of the dwelling by the simple expedient of assigning to the switchboard attendants the additional task of recording the requests for wake-up calls by the various guests and then ringing the telephone of each of those guests at the particular time requested. It is obvious that in the case of larger residences this places quite an additional burden on the switchboard attendants, particularly since the greater portion of the requests are usually concentrated within a relatively short period in the early morning. This method of procedure also involves the possibility of errors, either of omission or commission, which may result in a subscriber being called at the wrong time or not called at all.

An object of the present invention, therefore, is to improve telephone "wake-up" service both from the standpoint of the service rendered and from an economic standpoint.

A more specific object of the invention is to render telephone "wake-up" service on an automatic basis without any substantial effort on the part of the switchboard attendant.

In accordance with a particular feature of the present invention, each extension line is "marked" to indicate the particular time at which the subscriber wishes to be called.

In accordance with another feature of the invention all lines are automatically scanned periodically to detect lines having a marking which is congruous with the setting of a master clock at the moment of scanning.

In accordance with one specific embodiment of the invention the lines are marked by manual operation by the subscriber of a selective time switch provided in his room.

In accordance with a further embodiment of the invention, the lines are marked by the action of the attendant who, upon receiving a request from the subscriber, selects the proper time plug and inserts it in jacks connected to the line of the respective subscriber.

A full understanding of the arrangements contemplated by the present invention, as well as an appreciation of the various advantageous features thereof, may be gained from a consideration of the following detailed description in connection with the accompanying drawings in which.

Figure 1:
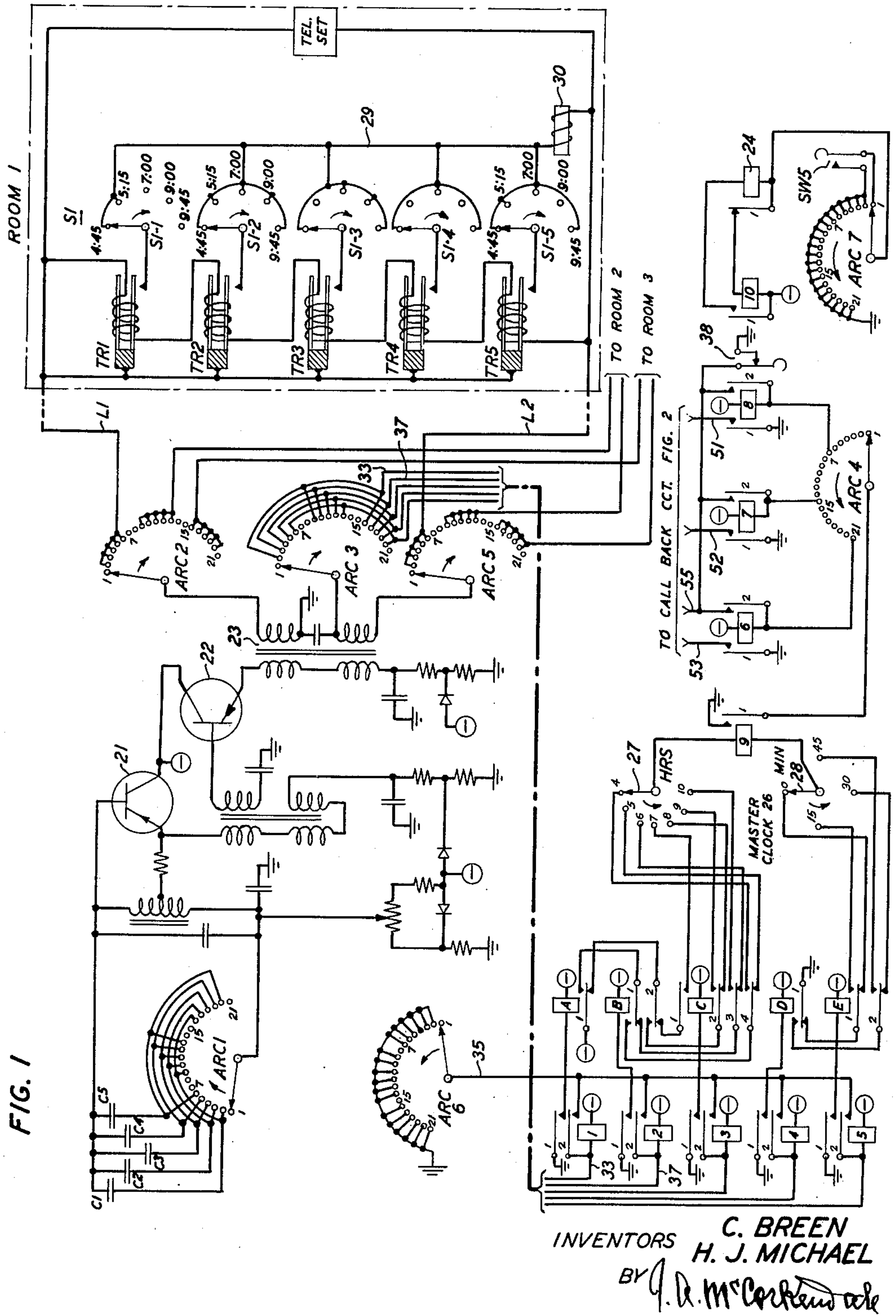
FIG. 1 is a schematic showing of the marking and scanning arrangement provided in accordance with one embodiment of the invention.

Referring now to the drawings, and first to FIG. 1, the marking and scanning arrangement disclosed has been limited to facilities necessary to provide morning call service to three different rooms only, in order to avoid undue complication of the disclosure. The equipment for one room has been shown in detail and connections for the equiment for the other two rooms have been indicated. It will be apparent that additional rooms can be served by the provision of additional similar equipment.

A manually operated time selecting switch, switch S1, is provided in "room 1." Switch S1 is provided with five banks, S1–1, S1–2, S1–3, S1–4 and S1–5 and, again for purposes of clarity, only five quarter-hour steps are shown on each bank. The steps shown are 4:45; 5:15; 7:00; 9:00 and 9:45 and it will be noted that the wiring plan for the contacts of each bank is different from that of each of the other banks. All five rotary arms of switch S1 are mechanically connected and move concurrently.

Five tuned reed selectors TR1; TR2; TR3; TR4; and TR5 are also provided in room 1, each being responsive to a different respective driving frequency. It may be assumed, for purposes of illustration alone, that these tuned reed selectors are responsive, respectively, to frequencies of 847.5 c.p.s.; 938.5 c.p.s.; 877.5 c.p.s.; 892.5 c.p.s.; and 907.5 c.p.s. and that the respective fork tines will vibrate when such frequency is applied to its associated coil. These tuned reed selectors may be of the general type disclosed in the Patent 2,877,319 issued to L. G. Bostwick and R. L. Guncelle on March 10, 1959, and entitled "Electromechanical Vibrator."

By the provision of five tuned reed selectors, as shown, and by using the selectors in various different combinations, thirty-one possible quarter-hour periods can be covered. Provision of a larger number of selectors will permit a correspondingly larger coverage, if desirable.

A highly stable transistor oscillator 21 is provided at a central point the output of which, after amplification by transistor amplifier 22, is supplied through transformer 23, rotary arm and contacts of ARC–2 and ARC–5 of a rotary selector switch, and over line conductors L1 and L2 to the driving windings of tuned reed selectors TR1 to TR5 in room 1.

The selector switch just referred to may be of the general type shown in O. F. Forsberg et al. United States Patent 1,472,465, October 30, 1923, and, in the embodiment illustrated, comprises seven arcs or contact banks, with a rotating brush or arm associated with each arc. The selector switch is rotatable through operation of stepping relay 10 and coil stepping switch 24, and is set into stepping operation when switch SW–5 is closed. If desirable, the rotary brushes of the various arcs may be driven by other means, for example, by a motor of ordinary construction.

Oscillator 21 and amplifier 22 are of general circuit configuration now well known in the art, and may follow general design principles set forth, for example, in R. L. Wallace United States Patents 2,652,460, September 15, 1953, and 2,681,996, June 22, 1954.

The exact frequency of the current produced by oscillator 21 and applied to the tuned reed selectors as above described is established by the connection of the capacitors $C_1$, $C_2$, $C_3$, $C_4$ and $C_5$ in turn to the input tuning circuit of oscillator 21. The values of these capacitors are so established in the specific embodiment selected for detailed disclosure that, as they are connected in turn to the input circuit of the oscillator, the output frequencies will be, in turn, 847.5 c.p.s.; 938.5 c.p.s.; 877.5 c.p.s.; 892.5 c.p.s.; and 907.5 c.p.s. The connection of the capacitors to the oscillator is controlled through ARC–1 of the rotary selector switch.

A time indicating means in the form of master clock 26 is provided which includes an "hour" contact arm 27 and a "minute" contact arm 28. The contact bank associated with the hour hand, in the illustrated embodiment of the invention is provided with seven "hour" contacts; four o'clock to ten o'clock, while the contact bank associated with the minute hand is provided with four "quarter-hour" contacts.

It will be assumed now, for purposes of further illustration that the occupant of room 1 wishes to be awakened at 4:45. Accordingly, before retiring for the night, he will "mark" his line for this time by setting the time switch S1 provided in his room to "4:45" as shown in FIG. 1. It will be noted that, in the instance of the 4:45 contacts of the five banks of switch S1, all are connected over lead 29 and through retard coil 30 to line conductor L2, while in the instances of the other time contacts the connections are different. In the instance of the 9:00 contacts, for example, only the second and third banks are connected to line conductor L2.

Scanning of the lines is started at the desired time by operating switch SW–5; this switch may be operated manually, or, if desired, it can be operated in conjunction with the master clock 26. It will be understood that, when switch SW–5 is operated, the contact arms associated with all seven arcs of the switch start to step or rotate in the directions indicated by the respective arrows due to the action of stepping relay 10 and coil stepping switch 24, and that, since contacts 2 to 21 of ARC–7 are strapped and connected to ground, this stepping action once started will continue until all the contacts of each arc have been traversed.

As the brush associated with ARC–1 passes over contacts 2 to 6, inclusive, capacitors $C_1$ to $C_5$ respectively are connected in turn to the input of oscillator 21, and, as pointed out above, the frequency of the output of the oscillator will be, in turn, 847.5 c.p.s.; 938.5 c.p.s.; 877.5 c.p.s.; 892.5 c.p.s. and 907.5 c.p.s. The output of the oscillator, after amplification by amplifier 22, is applied through transformer 23 to ARC–2 and ARC–5, and since the associated brushes are passing over contacts 2 to 6 of the respective contact banks, the oscillator output is applied across line conductors L1 and L2 and supplied to the driving coils of tuned reed selectors TR–1 to TR–5. These tuned reed selectors, as pointed out above, are assumed for purposes of illustration to be responsive, respectively, to frequencies of 847.5 c.p.s.; 938.5 c.p.s.; 877.5 c.p.s.; 892.5 c.p.s.; and 907.5 c.p.s. As the brushes associated with ARC–1, ARC–2 and ARC–5 traverse contacts 2 to 6 of the associated banks, the tuned reed selectors TR1 to TR5 will therefore vibrate in turn.

As the brush associated with ARC–3 engages contact No. 2 of the associated bank, a circuit is completed from ground, upper portion of secondary winding of transformer 23, brush and contact No. 2 of ARC–2, line conductor L1, fork and contact of selector TR1 (since it is vibrating at this time), brush and 4:45 terminal of bank S1–1 of switch S1, conductor 29, retard coil 30, line conductor L2, contact No. 2 and brush of ARC–5, lower portion of secondary winding of transformer 23, brush and contact No. 2 of ARC–3, conductor 33, winding of relay 1 to battery. Relay 1 operates over this path and locks up through its No. 2 make contacts and over conductor 35 to ground on ARC–6. Operation of relay 1 completes through its No. 1 make contacts an obvious operating path for relay A. Relay A operates, and is held operated since relay 1 has been locked up as previously pointed out.

Now, as rotation of the selector switch brushes continues and they reach contact No. 3 on the respective arcs, the second frequency 938.5 c.p.s., is applied to the line and over the line to the tuned reed selectors and selector TR2 starts to vibrate since it is responsive to this particular frequency. A circuit is now completed, therefore, from ground, upper portion of secondary winding of transformer 23, brush and No. 3 contact of ARC–2, line conductor L1, fork and contact of tuned reed selector TR2 (since it is vibrating at this time) brush and 4:45 terminal of bank S1–2 of switch S1, conductor 29, retard coil 30, line conductor L2, contact No. 3 and brush of ARC–5, lower portion of secondary winding of transformer 23, brush and No. 3 contact of ARC–3, conductor 37, winding of relay 2 to battery, relay 2 operating over this path. Relay 2, upon operating locks up on a circuit through its No. 2 make contacts over conductor 35 to ground on ARC–6. Operation of relay 2 completes through its No. 1 make contacts an obvious operating path for relay B. Relay B operates and is held operated since relay 2 is locked in operated position as previously described.

As rotation of the brushes of the selector switch continues, and as contacts No. 4, No. 5 and No. 6 of the respective arcs are engaged by the associated brushes, relay 3, relay 4 and relay 5 all operate, in turn, over circuits similar to the operating paths traced above for relay 1 and relay 2. Operation of relay 3 completes an obvious operating circuit for relay C; operation of relay 4 completes an obvious operating circuit for relay D; and, similarly, operation of relay 5 completes an operating circuit for relay E. Relay C, relay D and relay E are held operated since relay 3, relay 4 and relay 5 are locked in operated position over conductor 35 to ground on ARC–6.

For this particular time setting, therefore, i.e., 4:45, when the rotating brushes of the selector switch engage contact No. 7 of the respective arcs, relay A, relay B, relay C, relay D and relay E are all in operated condition. It will be noted that with regard to ARC–1, ARC–2, ARC–3 and ARC–5, the No. 7 contacts of the respective banks are vacant or unwired. It will be kept in mind also that the "hour" brush 27 of the master clock 26 is in engagement with the "4" hour contact and that the "minute" brush 28 is in engagement with "45" minute contact.

With regard to the time request of room No. 1, the No. 7 contact position of the rotary selector switch is the point at which the position of the time indicating device, or master clock, and the time request of room 1, as represented by the condition of relays A to E, are compared to determine whether or not there is congruity between the marking of the line and the position of the master clock. If such congruity exists relay 9 will operate as now described.

In the present instance a circuit may be traced from battery, No. 1 make contacts of relay A, No. 1 make contacts of relay B, No. 4 make contacts of relay C, "4" hour contact and hour brush 27 of master clock 26, winding of relay 9, minute brush 28 and "45" minute contact of the master clock, No. 2 make contacts of relay E, and No. 1 make contacts of relay D to ground. Relay 9 operates over this path, indicating congruity between the time for which the line of room 1 is "marked" and the actual time as indicated by master clock 26.

Operation of relay 9 completes a circuit from ground, No. 1 make contacts of relay 9, brush and contact No. 7 of ARC–4, winding of relay 8 to battery, relay 8 operating over this circuit. Relay 8 upon operating locks up over a circuit from battery, operating winding and No. 2 make contacts of relay 8 to ground on normally closed switch 38.

Operation of relay 8 places ground on conductor 51 which leads to the call back circuit for room No. 1. This call back circuit will be described in detail subsequently with reference to FIG. 2.

It will be understood that, as indicated on the drawing, the conductors associated with contacts 9 to 13 and 16 to 20 of the respective banks of ARC–2 and ARC–3 are connected to time switches S2 and S3 located in room 2 and room 3, respectively, and that conductors 52 and 53 are associated with the call back circuits of room 2 and room 3, respectively. Comparison of the relay positions and the position of the master clock is made for room 2 when the selector brushes reach terminal No. 15 on each arc, and for room 3 when the brushes reach contact No. 21 on each arc. Also it will be apparent that many different time settings are provided for by the unique combination of "wired" and "non-wired" contacts on the several banks of switch S1 and also by the unique interconnection of the different contact combinations of relays A to E and the "Hours" and "Minutes" contacts of the master clock. Different settings of time switch S1 result, of course, in operation of different combinations of relays 1 to 5 and relays A to E, and it is only when comparison of relay conditions and time clock position indicates congruity that relay 9 operates to place ground on the start lead of the respective call back circuit.

Figures 2, 3:
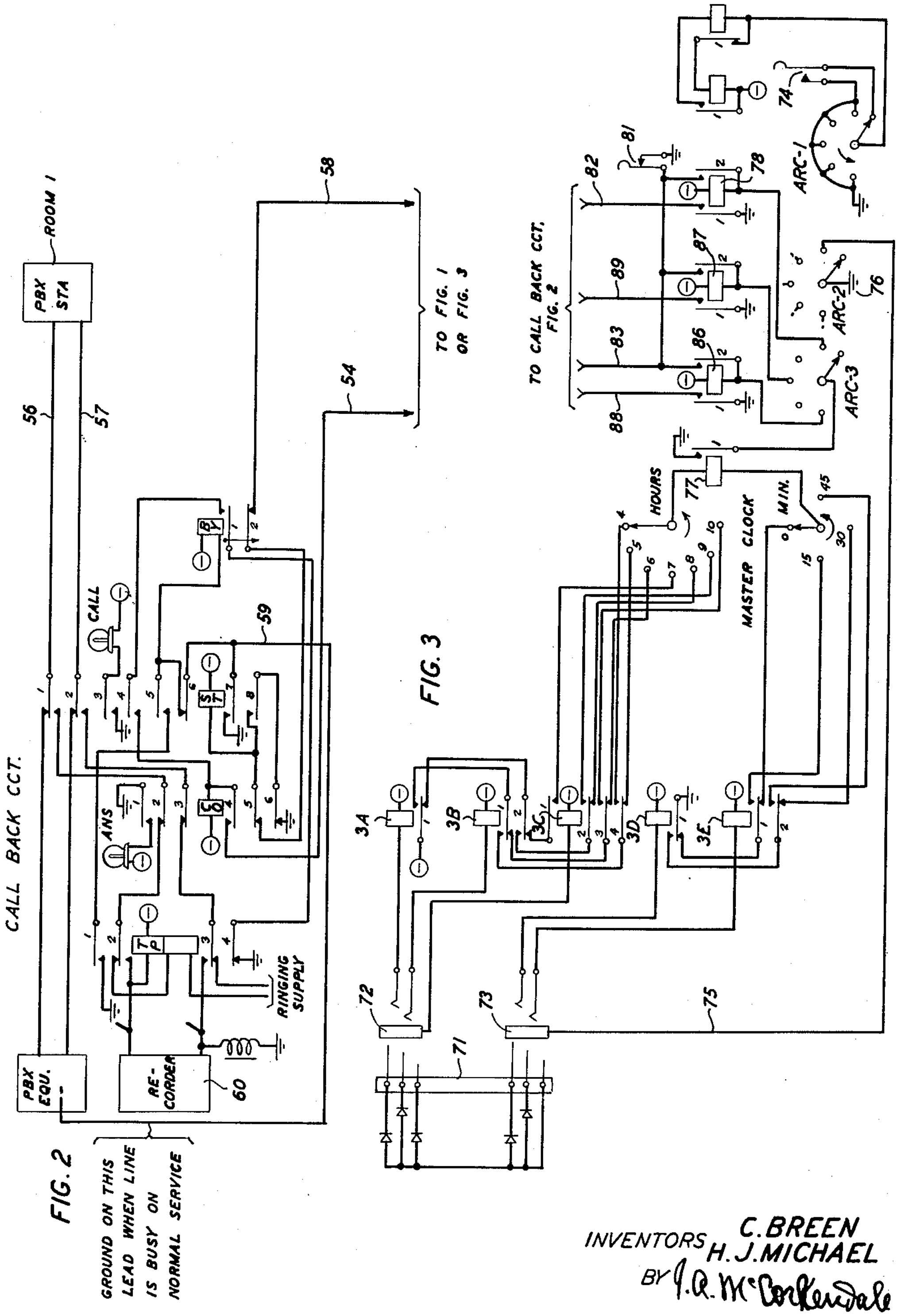
FIG. 2 is a schematic showing of the call back circuit.
FIG. 3 is a schematic showing of the marking and scanning arrangement provided in accordance with the second embodiment of the invention.

Referring now to FIG. 2, the subscriber's station of room 1 is normally connected to the private branch exchange switchboard over line conductors 56 and 57. Assuming that ground has been connected to start lead 58, over lead 51 as set forth in the foregoing description of the circuit of FIG. 1, and assuming also that the line is not busy on a normal service call (relay BY is unoperated), a circuit will be completed from ground on lead 58, No. 2 back contacts of relay BY, No. 5 back contacts of relay CO, winding of relay ST to battery, relay ST operating over this path. Relay ST, upon operating, holds over a path from battery winding and No. 8 make contacts of relay ST. No. 6 back contacts of relay CO, to ground.

Operation of relay ST disconnects the normal private branch exchange equipment from line conductors 56 and 57 and connects ringing current thereto over a path including No. 3 and No. 2 back contacts of relay TP; No. 3 and No. 2 back contacts of relay CO and No. 1 and No. 2 make contacts of relay ST. Operation of relay ST also completes through its No. 3 make contacts an obvious circuit for energizing the Call lamp which lights to indicate that the subscriber's station at room 1 is being called.

Operation of relay ST also connects ground through its No. 7 make contacts to lead 59 thereby marking the line "busy" at the PBX equipment in the normal manner.

When the subscriber in room 1 answers the call the line loop is completed at the subscriber's telephone set and relay TP operates since the ringing current path previously described includes the lower winding of relay TP as a series element. Relay TP upon operating holds in that position over a path from battery, upper winding and No. 2 make contacts of relay TP, No. 2 back contacts of relay CO, No. 1 make contacts of relay ST, over line conductor 56 to ground at the subscriber's telephone set.

Operation of relay TP disconnects ringing current from the line and connects the output of recorder 60 thereto. Also, a path is completed for operation of relay BY traced from battery, winding of relay BY, No. 5 make contacts of relay ST, No. 1 make contacts of relay TP to ground. Operation of relay BY partially completes an operating circuit for relay CO and also opens start lead 58; relay ST remains operated, however, over the holding path previously traced.

The message prerecorded on recorder 60 is now delivered to the subscriber in room 1; this message may be of any desired content and may include, for example, "It is now the time at which you wished to be called."

After the subscriber in room 1 receives the previously recorded message and hangs up, relay TP will release since the ground at the telephone set is removed from the line. While release of relay TP will open the operating path of relay BY at its No. 1 make contacts, relay BY is slow-to-release as compared with relay TP so that, after release of relay TP but before release of relay BY, an operating path for relay CO is completed from battery, winding of relay CO, No. 4 make contacts of relay ST, No. 1 make contacts of relay BY to ground on No. 4 back contacts of relay TP. Relay CO upon operating locks in this position over a path from battery, winding and No. 4 make contacts of relay CO, lead 54, to lead 55 of FIG. 1 and to ground on normally closed switch 38.

Operation of relay CO opens at its No. 6 back contacts the holding path for relay ST which thereupon releases. Operation of relay CO also opens start lead 58 at its No. 5 back contacts thus preventing the line to room 1 from being reseized. Operation of relay CO, further, completes at its No. 1 make contacts an obvious energizing circuit for the ANS lamp, which lights as an indication that the wake-up service call to room 1 has been answered. Relay CO remains operated over the locking path referred to above until such time as key 38 (FIG. 1) is operated to remove ground from lead 55. Key 38 will ordinarily be operated by the attendant upon observing that the ANS lamp is lit. The circuit is restored to normal condition upon release of relay CO.

In the event the line to room 1 had already been busy on a normal connection at the time the line was selected by the time service scanning equipment, relay BY would be operated since ground would have been applied to lead 59 by the PBX equipment in the normal manner; start lead 58 would therefore be opened to prevent seizure of the line by the time service equipment. The line would then be picked up by a subsequent "scan."

It will be apparent that in the instance of the embodiment of the invention just described the special wake-up service is rendered on an automatic basis with very little attention required on the part of the attendants. Further, the "marking" of the line for the desired wake-up time is under the exclusive control of the room occupant thus freeing the PBX attendants of any responsibility for possible errors.

Referring now to FIG. 3, a second embodiment of the invention is shown in accordance with which the line is "marked" according to the desired time of call by use of a time plug. The time plug assembly comprises a twin plug having wired to the tip, ring and sleeve of one plug and to the tip and ring of the other plug various combinations of from one to five diodes. Upon receipt of a "call" request, the attendant selects the proper time plug and inserts it in jacks associated with the subscriber's line thereby marking the line for subsequent automatic scanning.

Time plug 71 is selected by the attendant in accordance with the "call time" requested by the occupant of room 1, and is inserted in time service jacks 72 and 73 which are assigned to the line of room 1. Similarly, other time marking plugs are inserted in the jacks assigned to other lines as call requests are received therefrom. It will be assumed that the occupant of room 1 has requested to be called at 4:45, plug 71 corresponding to this time. It will be noted that in the instance of plug 71, diodes are connected to the tip, ring and sleeve of the upper twin plug and to the tip and ring of the lower twin plug; the sleeve of the lower plug acts as a common input for the combination.

As in the instance of the arrangement of FIG. 1, a rotary selector switch is provided which comprises ARC–1, ARC–2 and ARC–3. When it is desired to scan the lines, the stepping operation of the selector switch is started by momentarily closing switch 74 which may either be manually operated or operated automatically in conjunction with the master clock. Contact No. 2 of ARC–2 will be assumed to be assigned to room 1 and, as shown, is connected to the sleeve of jack 73. When the brush of ARC–2 engages contact No. 2, obvious paths are completed from ground 76 over lead 75 to the sleeve of jack 73, plug 71, through the tip, ring and sleeve conductors of jack 72 and the tip and ring conductors of jack 73, through the operating windings of respective relays 3A; 3B; 3C; 3D; and 3E to battery, the five relays all operating over these respective paths.

At this same time the brush of ARC–3 engages contact No. 2 of that arc and a comparison is made for detection of possible congruity between the position of the master clock, 4:45, and the "marking" of the line by plug 71. With relays 3A; 3B; 3C; 3D; and 3E operated as described above, and with the time indicating means or master clock showing 4:45 a circuit is completed from battery, No. 1 make contacts of relay 3A; No. 1 make contacts of relay 3B; No. 4 make contacts of relay 3C; "4" hour terminal and hour contact arm of the master clock, winding of relay 77, "45 minute" terminal of the master clock, No. 2 make contacts of relay 3E, No. 1 make contacts of relay 3D to ground, relay 77 operating over this path.

Relay 77 by its operation completes a path from ground, No. 1 make contacts of relay 77, brush and No. 2 contact of ARC–3, winding of relay 78 to battery; relay 78 operates over this path and locks up over a path from battery, winding and No. 2 make contacts of relay 78 to ground on normally closed switch 81.

Operation of relay 78 places ground on lead 82 which connects to start lead 58 of the call back circuit of FIG. 2 and establishes a call back circuit to the subscriber's station in room 1 in the manner described above in connection with FIG. 2. The call back circuit functions in the manner previously described and is maintained until the holding ground on lead 83 is removed by operation of switch 81.

It will be understood that leads 82 and 83 of FIG. 3 correspond with regard to function to leads 51 and 55, respectively of FIG. 1. It will be understood, further, that as rotation of the selector switch progresses, the brush of ARC–2 will scan in turn jacks associated with other lines while the brush of ARC–3 will establish paths for operation of additional relays, such as relays 86 and 87 corresponding to relay 78, when congruity between the marking established by a particular time plug and the position of the master clock is detected. Operation of relays 86 and 87 results in placing ground on leads 88 and 89, respectively, which correspond in function to leads 53 and 52 of FIG. 1.

It will be understood that many different time markings may be provided for by the different combinations of diode connections that may be effected in the time plugs. It will be apparent, further, that the call service is rendered substantially on an automatic basis, practically the only action required by the attendant being selection and insertion of the proper plugs in accordance with the time requests.

While certain specific embodiments of the invention have been selected for detailed description, the invention is not, of course, limited in its application to the embodiments described. The embodiments which have been described should be taken as illustrative rather than restrictive thereof.

What is claimed is:

1. In a morning call system, a plurality of subscribers' telephone lines terminating at a central point, time indicating means at said central point, means independent of said time indicating means for selectively marking each of said lines to indicate a desired time of call, said marking means comprising selectively settable circuitry for providing different electrical signals for different settings thereof and representative of respective different said times of call, means at said central point for periodically scanning each of said lines for detecting congruity between the marking of a particular line and the position of said time indicating means, and means effective upon detection of such congruity for establishing a separate connection to the particular line involved.

2. In a morning call system, a plurality of subscribers' telephone lines terminating at a central point, time indicating means at said central point, means independent of said time indicating means for selectively marking each of said lines to indicate a desired time of call, said marking means including a marking circuit, a plurality of tuned reed selectors each responsive to a different driving frequency, means for supplying driving frequencies to said selectors and means for connecting selected ones of said tuned reed selectors in the marking circuit, means at said central point for periodically scanning each of said lines for detecting congruity between the marking of a particular line and the position of said time indicating means, and means effective upon detection of such congruity for establishing a separate connection to the particular line involved.

3. In a morning call system, a plurality of subscribers' telephone lines terminating at a central point, time indicating means at said central point, means independent of said time indicating means for selectively marking each of said lines to indicate a desired time of call, said marking means comprising selectively settable circuitry for providing different electrical signals for different settings thereof and representative of respective different said times of call, a group of relays connected in circuit between said marking means and said time indicating means, means for selectively operating relays in said group in accordance with the time marking signal of a particular line to indicate the corresponding desired time of call, a call back circuit for said particular line, and means effective upon detection of congruity between the time marking of said particular line as indicated by operated relays in said group and the position of said time indicating means for completing the connection of said call back circuit to said particular line.

4. In a morning call system, a plurality of subscribers' telephone lines terminating at a central point, time indicating means at said central point, means independent of said time indicating means for selectively marking each of said lines to indicate a desired time of call, said marking means including multielement plugs with different combinations of conductors, each combination corresponding to a different specific time of call, means at said central point for periodically scanning each of said lines, a group of relays connected in circuit with said time indicating means, means for connecting one of said multielement plugs in circuit with said group of relays, means for selectively operating relays in said group in accordance with the particular combination of conductors of said one plug, a call back circuit, and means effective upon detection of congruity between the time marking of a line as indicated by operated relays in said group and the position of said time indicating means for completing the connection of said call back circuit to one of said lines.

5. In a morning call system, a plurality of subscribers' telephone lines terminating at a central point, time indicating means at said central point, means independent of said time indicating means for selectively marking each of said lines to indicate a desired time of call, said marking means including a plurality of tuned reed selectors and means for selectively driving said tuned reed selectors, a group of relays connected in circuit between said marking means and said time indicating means, means for selectively operating relays in said group over paths completed through said tuned reed selectors selectively connected in said paths in accordance with the time marking of a particular line, a call back circuit for said particular line, means for periodically scanning said lines, and means effective upon detection during said scanning of congruity between the time marking of said particular line as indicated by operated relays in said group and the position of said time indicating means for completing the connection of said call back circuit to said particular line.

6. In a morning call system, a plurality of subscribers' telephone lines terminating at a central point, time indicating means at said central point, a plurality of relays connected in circuit with said time indicating means, means independent of said time indicating means for selectively marking each of said lines to indicate a desired time of call, said marking means comprising a multielement plug with a particular combination of conductors corresponding to a specific time of call, means for connecting said time marking means in circuit with said relays, the particular combination of conductors of said time marking means being effective to partially complete the operating paths of said relays, means at said central point for periodically scanning each of said lines to complete said operating paths, means for detecting congruity between the position of said time indicating means and the time marked by said time marking means, and means effective upon indication of said congruity for establishing a call back circuit to one of said telephone lines.

7. In a morning call system, a plurality of subscribers' telephone lines terminating at a central point, time indicating means at said central point, a multibank rotary selector switch at said central point, means associated with each of said lines and independent of said time indicating means for selectively marking each line to indicate a desired time of call, said marking means comprising selectively settable circuitry for providing different electrical signals for different settings thereof and representative of respective different said times of call, a group of relays connected in circuit between said time indicating means and said marking means, means effective upon rotation of said selector switch for selectively operating certain of the relays in said group in accordance with the time marking of a particular line, a call back circuit for said particular line, and means effective upon detection of congruity between the time marking of said particular line as indicated by operated relays in said group and the position of said time indicating means for completing the connection of said call back circuit to said particular line.

8. In a morning call system, a plurality of subscribers' telephone lines terminating at a central point, a multibank rotary switch at said central point, a plurality of tuned reed selectors each responsive to a different driving frequency, an oscillator, means effective upon operation of said rotary switch for selectively changing the tuning circuit of said oscillator in discrete steps whereby a series of frequencies are produced by said oscillator corresponding respectively to the frequencies to which said tuned reed selectors are responsive, means for applying said respective frequencies to the driving coils of said tuned reed selectors whereby to cause the operation thereof in turn, time indicating means at said central point, means independent of said time indicating means for marking each of said telephone lines to indicate a desired time of call, said marking means including a contact associated with each of said tuned reed selectors which is closed when the associated tuned reed selector is vibrating, a group of relays connected in circuit between said time indicating means and said marking means, means effective upon operation of said rotary switch for selectively operating certain or all of said relays in said group in accordance with the particular combination of said contacts closed by respective tuned reed selectors during operation of said rotary switch, means for periodically scanning said lines, means effective upon detection during scanning of congruity between the position of said time indicating means and the time marking of a particular line as indicated by operated relays in said group for establishing a call back circuit to said particular line.

9. In a morning call system, a plurality of subscribers' telephone lines terminating at a central point, time indicating means at said central point, means independent of said time indicating means for selectively marking each of said lines to indicate a desired time of call, said marking means comprising selectively settable circuitry for providing different electrical signals for different settings thereof and representative of respective different said times of call, means at said central point for periodically scanning each of said lines and for translating the signal marking on each line into the corresponding indication of a desired time of call and for detecting congruity between said desired times of call indication and the position of said time indicating means, and means effective upon detection of such congruity for establishing a separate connection to the particular line.

10. In a morning call system, a plurality of subscribers' telephone lines terminating at a central point, time indicating means at said central point, means independent of said line indicating means for selectively marking each of said lines to indicate a desired time of call, said marking means comprising selectively settable circuitry for providing different electrical signals for different settings thereof and representative of respective different said times of call, means at said central point for periodically scanning each of said lines and for translating the signal marking on each line into the corresponding indication of a desired time of call, detecting means under the control of said translating means for detecting congruity between said desired time of call indication and the position of said time indicating means, and means effective upon detection of such congruity for establishing a separate connection to the particular line.

11. In a morning call system, a plurality of subscribers' telephone lines terminating at a central point, time indicating means at said central point, means independent of said time indicating means for selectively marking each of said lines to indicate a desired time of call, said marking means comprising selectively settable circuitry for providing different electrical signals for different settings thereof and representative of respective different said times of call, means at said central point for periodically scanning each of said lines, translating means under the control of said scanning means for translating the electrical signal marking on each scanned line into the corresponding indication of a desired time of call, detecting means under control of said translating means and of said time indicating means for detecting congruity between said desired time of call indication and the position of said time indicating means, and means effective upon detection of such congruity for establishing a separate connection to the particular line involved.

12. The invention defined in claim 11 wherein said selectively settable circuitry comprises a first plurality of selectively enabled electrical components for providing the said different electrical signals and wherein said translating means comprises a second plurality of electrical components selectively operative by said signals.

13. The invention defined in claim 12 wherein said first components provide said signals under the control of said scanning means, wherein said second components comprise relays responsive to said signals, and wherein said detecting means comprises a relay.

14. The invention defined in claim 13 wherein said marking means further comprises adjustable gating means for predetermining the number of said first components to be selectively enabled.

15. The invention defined in claim 14 wherein said first components comprise tuned reed selectors and wherein said gating means comprises manually settable rotary switches.

16. The invention defined in claim 15 wherein said first components include a plurality of tuned reed selectors each responsive to a different frequency and operable to partially complete an operating path for a corresponding relay in said translator, wherein contacts are provided and controlled by said translator relays, wherein said gating means comprises a plurality of manually settable rotary switches each associated with a particular tuned reed selector and capable of completing said operating path depending on the setting of said rotary switch, wherein said time indicating means comprises a plurality of automatically operated rotary switches each having a single rotary wiper and having a plurality of fixed contacts whereby the different rotary positions of said wipers with respect to said fixed contacts represent different times of day, wherein is provided an operating winding for said detecting relay in series with said rotary wipers, wherein the said fixed contacts are selectively interconnected with said translator relay contacts and whereby said detecting relay operates when the time indicated by the operated translator relays agrees with the time of day indication represented by the rotary positions of said automatically operated rotary switches, and wherein said separate connection to said particular line is established under the control of said operated detecting relay.

17. The invention defined in claim 14 wherein said first components comprise conducting paths and wherein said gating means comprises unidirectional current carrying impedances in series with said paths and selectively oriented so as to enable selective paths to conduct.

18. The invention defined in claim 17 wherein said conducting paths comprise metallic conductors, wherein said impedances comprise diodes, wherein contacts are provided and controlled by said translator relays, wherein each translator relay is provided with an operating winding connected in series with a different one of said conductors, wherein said time indicating means comprises a plurality of automatically operated rotary switches each having a single rotary wiper and having a plurality of fixed contacts whereby the different rotary positions of said wipers with respect to said fixed contacts represent different times of day, wherein is provided an operating winding for said detecting relay in series with said rotary wipers, wherein the said fixed contacts are selectively interconnected with said translator relay contacts and whereby said detecting relay operates when the time indicated by the operated translator relays agrees with the time of day indication represented by the rotary positions of said automatically operated rotary switches, and wherein said separate connection to said particular line is established under the control of said operated detecting relay.

References Cited in the file of this patent

UNITED STATES PATENTS

| | | |
|---|---|---|
| 584,173 | Chance | June 8, 1897 |
| 2,483,214 | Lomax | Sept. 27, 1949 |
| 2,856,461 | Beilfuss | Oct. 14, 1958 |